E. T. PURSER.
TEETH AND LINKS FOR CHAIN SAWS.
APPLICATION FILED NOV. 13, 1908.
945,599.
Patented Jan. 4, 1910.
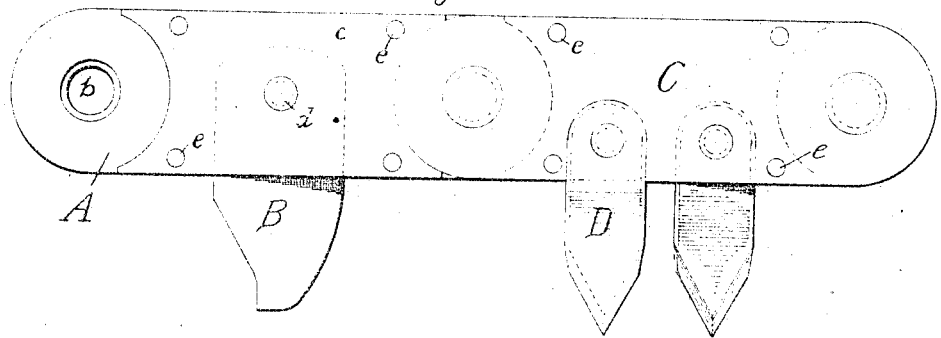
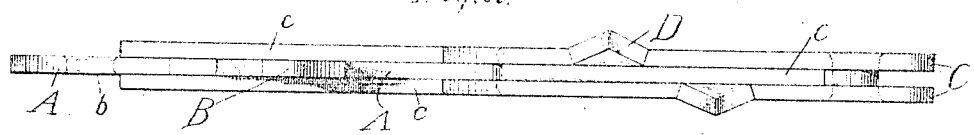
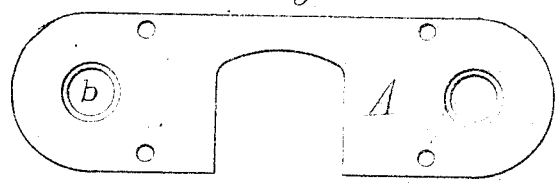
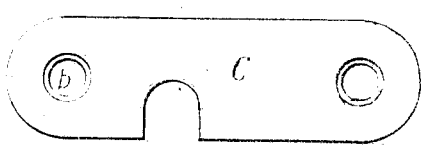
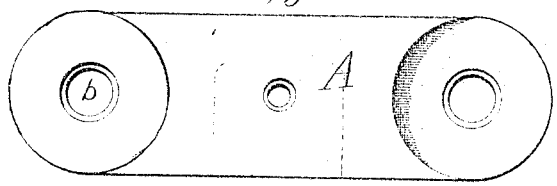
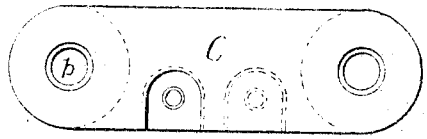
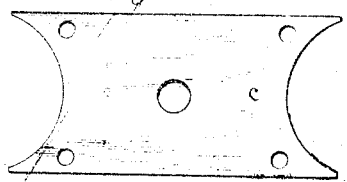
ATTEST.
Benth. M. Stahl
Edward N. Seton
INVENTOR.
Edward T. Purser
By Spear & Sealy
Atty's.

UNITED STATES PATENT OFFICE.

EDWARD T. PURSER, OF SAN FRANCISCO, CALIFORNIA, ASSIGNOR TO ENDLESS CHAIN SAW CO., A CORPORATION OF ARIZONA TERRITORY.

TEETH AND LINKS FOR CHAIN SAWS.

945,599.   Specification of Letters Patent.   Patented Jan. 4, 1910.

Application filed November 13, 1908. Serial No. 462,504.

*To all whom it may concern:*

Be it known that I, EDWARD T. PURSER, a citizen of the United States, residing at San Francisco, in the county of San Francisco, State of California, have invented new and useful Improvements in Teeth and Links for Chain Saws, of which the following is a specification.

My invention relates to chain saws, and it is the object of my present invention to improve the details of construction both of the teeth and the links of such chain saws, so as to secure effective action with ease and cheapness of construction and great durability.

In the accompanying drawings, Figure 1 is a plan view of two links of the chain saw embodying my improvements. Fig. 2 is an edge view of the same; Figs. 3, 4, 5 show details; Figs. 6 and 7 show modified forms of the links; Figs. 5 and 7 being on reduced scale. Fig. 8 shows an edge view of a tapered link.

I prefer to utilize my improved saw in cutting on a concave line, though I do not limit myself in this connection.

As shown in Figs. 1, 2, 6 and 7, the chain saw is made up of a series of double links, one of which, C, carries two cutting teeth, D, one of which teeth, by engaging in a sprocket wheel or other suitable driving device, may be used to put the saw in motion; and the other link carries a clearing tooth B, which also by engaging with a sprocket wheel or other suitable device, may be used to put the saw in motion. I prefer to use the latter tooth B as a means of driving the saw, but I do not limit myself to it. In both cases the back of the tooth is the part which engages with the sprocket wheel or other driving device.

The links of the form shown in Figs. 1 and 2 are made up as follows: I provide a center plate, as shown in Fig. 3, and it has a recess $a$, which is adapted to receive the base of the tooth B, which fits snugly within the recess $a$. The plate A is of full length of the link, and has rounded ends with openings therein, as at $b$, to receive the usual rivets. In order to provide for securely holding the tooth B in place, I utilize filler plates, as shown in Fig. 4 at $c$, and place one on each side of the plate A, as shown in Fig. 1, covering the recess therein and the end of the tooth B located in the recess. I then secure the parts together by a rivet $d$, which passes through the two filler plates and the base of the tooth B. I further secure the parts together by rivets $e$, passing through the corners or ends of the filler plates $c$, and the intermediate plate A. The projecting end of the tooth B, as heretofore described, is provided on one face with an edge designed to clear out the kerf, while its rear face engages with the sprocket or other driving connection.

In the construction of the other, or alternating, link I utilize two outer plates, both being of the full length of the link, one of which is shown on a reduced scale in detail in Fig. 5 at C. These plates have rounded ends which overlap the ends of the intermediate plate A of the preceding link, and are swiveled thereto by means of rivets. Each plate C has a recess, out of line with one another, adapted to receive a cutting tooth D, the back of which may be utilized to engage with the sprocket or other driving connection. Between these tooth carrying plates I place a filler plate $c$, this filler plate being riveted to the outer plates by four rivets $e$, while the cutting teeth are secured by rivets which pass through one of the outer plates and the intermediate plate. The teeth are further supported by reason of the fact that their edges where fitting in the plates are beveled, and the recesses in the outer plates are beveled to correspond. The cutting ends, or points, of these teeth are bent outwardly, or flared, slightly, as shown in Fig. 2, and thus a cut is made slightly exceeding the thickness of the link, thereby preventing any danger of undue friction between the link and the wood. The construction is a very simple one. The teeth are readily removed and replaced, and all the links of the chain saw are built up of only three forms of plates.

While the above is the form of link I prefer, yet I do not limit myself to it. The links shown in Figs. 6 and 7 the latter on a reduced scale, while of the same shape and size as those shown in Figs. 1 and 2, are each made out of one solid piece of iron or steel or other suitable metal, and are not built up of plates. Recesses for the teeth, similar to those shown in the built up links, are milled, as are, also, the ends of the male links A, while the ends of the female links C are slotted either by milling or sawing, so as to receive the milled ends of the male links. The teeth are riveted into the recesses milled in these links, and these recesses are beveled to correspond with the beveling on the base of the inserted teeth.

While I prefer to slightly flare the ends of the cutting teeth, and, thereby, prevent any binding of the saw while in work, yet the same effect can be produced by slightly tapering the links from their fronts, or cutting edges, to their backs, as shown in Fig. 8.

What I claim is:

1. In a chain saw, a link composed of a central plate, having a recess, a tooth fitted to said recess, and filler plates holding the tooth in place, substantially as described.

2. In a chain saw, a link comprising filler plate and two outer plates, having recesses in staggered relation to each other and cutting teeth fitted to said recesses, substantially as described.

In testimony whereof I have affixed my signature in the presence of two witnesses.

EDWARD T. PURSER.

Witnesses:
FRANK L. OWEN,
A. DIXON.